June 9, 1931.　　　　E. V. GRIGGS　　　　1,809,625
ELECTRIC CONTROL CIRCUITS
Filed Oct. 3, 1921　　　2 Sheets-Sheet 1

Inventor:
Elmer V. Griggs,
by C. C. Sprague Atty.

June 9, 1931.  E. V. GRIGGS  1,809,625
ELECTRIC CONTROL CIRCUITS
Filed Oct. 3, 1921   2 Sheets-Sheet 2
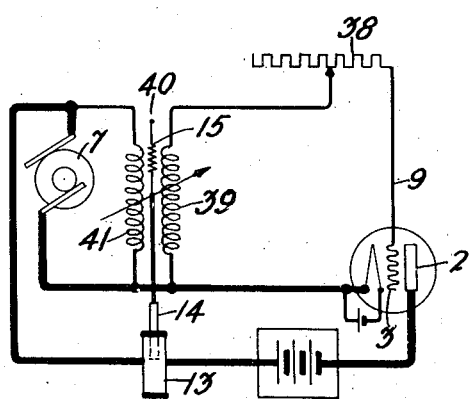
Fig. 5.
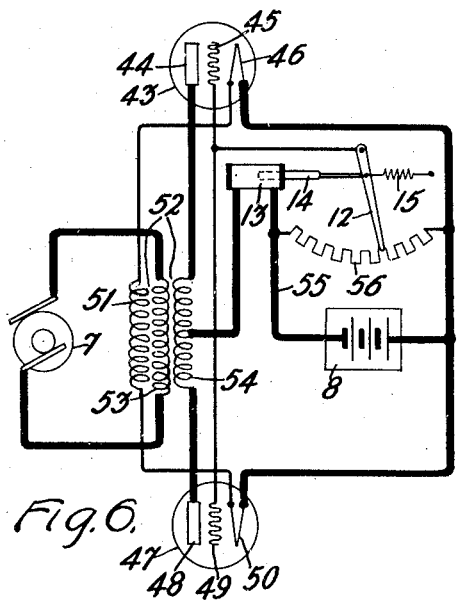
Fig. 6.
Fig. 7.
Fig. 8.
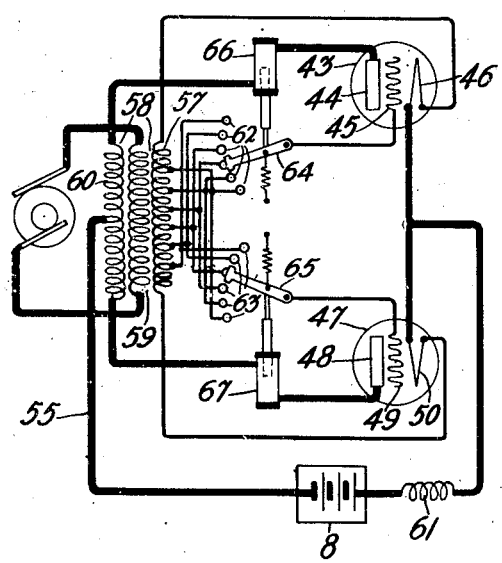
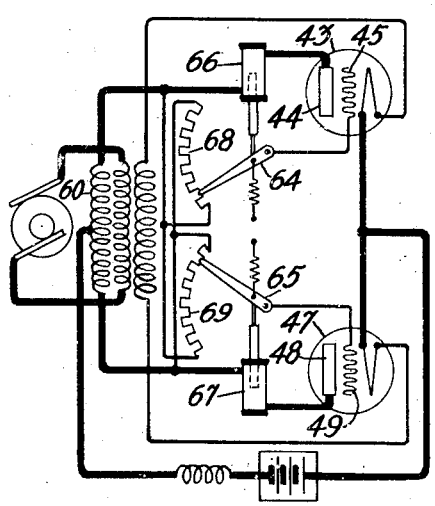
Inventor:
Elmer V. Griggs,
by C. C. Sprague, Atty.

Patented June 9, 1931

1,809,625

UNITED STATES PATENT OFFICE

ELMER V. GRIGGS, OF EAST ORANGE, NEW JERSEY, ASSIGNOR TO WESTERN ELECTRIC COMPANY, INCORPORATED, OF NEW YORK, N. Y., A CORPORATION OF NEW YORK

ELECTRIC CONTROL CIRCUITS

Application filed October 3, 1921. Serial No. 504,933.

This invention relates to electric control circuits, and more particularly to circuits containing electric discharge devices for the purpose of controlling the current or potential in certain portions of the circuit, or for rectifying alternating currents.

The term "electric discharge device" is used, in this specification, to describe generically any device such as a gas, vapor, or vacuum tube, or the like, in which electric current is conveyed by means of electrons, ions, or the like.

In rectifying systems for charging storage batteries, it is desirable to regulate the current or potential supplied to a battery while the supply voltage varies or the back potential of the battery varies during the charging process. One object of the invention is to provide the necessary means for controlling the charging current or potential of a storage battery.

In accordance with the present invention, a discharge device having an anode and a cathode is used simultaneously as a rectifier and as a control device functioning similarly to a rheostat. The magnitude of the rectified current is controlled by manually or automatically varying the temperature of the cathode or the potential of a grid element to vary the impedance of the rectifier, the automatic variation being accomplished by means of a solenoid actuated by the rectified current.

These and other objects of the invention will be apparent from the detailed description of the invention taken together with the appended drawings and claims.

Fig. 5 illustrates a rectifier provided with a variable mutual inductance for controlling the grid potential.

Fig. 6 shows a two-tube rectifier for using both alternations of a current wave, and is provided with single means for controlling the potential of the grids.

Fig. 7 shows a two-tube rectifier with independent means for controlling the potential of each grid, the grid potential being derived from the cathode heating circuit.

Fig. 8 is similar to Fig. 7, but differs therefrom in deriving the grid potential from the anode circuit.

Figure 1:
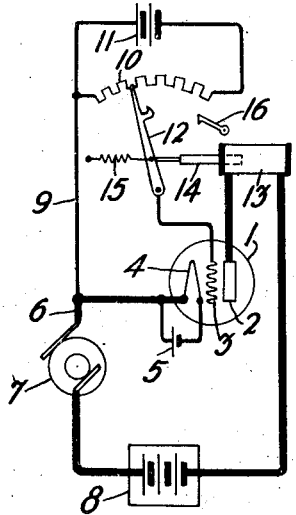
Fig. 1 illustrates a simple form of grid controlled rectifier provided with a potentiometer in the grid circuit.

In Fig. 1 the electric discharge device 1 includes therein the anode 2, grid 3, and the cathode 4 heated by the source of current 5. Between the anode 2 and the cathode 4 is connected the anode circuit 6 including therein the source of alternating current 7 and the storage battery, or other energy absorbing means 8, to be supplied with current from the source 7. Between the grid 3 and the cathode 4 is connected the grid or control circuit 9, including therein a potentiometer 10 energized by the source of potential 11, and poled in such a direction as to apply a negative potential to the grid 3. By varying the position of the rotary contact arm 12, the potential of grid 3, with respect to the cathode 4 may be adjusted to any desired value. In order to automatically adjust the position of contact arm 12, a solenoid, or other electrically responsive element 13, may be inserted in series in the anode circuit 6 to attract the plunger 14 and move the arm 12 in opposition to the restoring spring 15. A latch 16 is provided to hold the arm 12 in an extreme position when the battery is not being charged. In this extreme position, a maximum negative potential is applied to the grid 3 to render the tube substantially non-conducting. The latch 16, although not shown in the other figures, may be applied thereto in the manner shown in Fig. 1.

The operation of the system of Fig. 1 is as follows: the latch 16 which normally holds the arm 12 to the right when battery 8 is not being charged is actuated to release arm 12. The tube 1 thereupon changes from a non-conducting to a conducting condition as the arm 12 is pulled to the left by spring 15, and the negative potential derived from the potentiometer 10 applied to the grid 3 is gradually decreased. The impedance of the tube decreases gradually, or by degrees, until the current flowing therethrough is large enough to produce a pull upon the plunger 14 substantially equal to the pull of the spring 15. No further change occurs in the position of the arm 12 until the potential of the source 7, the back potential of the battery 8, or the potential in some other portion of the circuit varies. As soon as the potential of the source 7 increases and the current being supplied to the battery 8 begins to increase, there will be an increased pull upon plunger 14 causing it to rotate the arm 12 to the right where a more negative potential is applied to the grid and the impedance of the tube 1 increases by an amount sufficient to compensate for the increased potential of source 7, thus maintaining the current substantially constant. For stability of operation, however, it will be noted in Fig. 1, as well as in the other figures, that the current through the solenoid 13 is very slightly in excess of that flowing before the increase in potential of source 7. If now the potential increases still further, the arm 12 will move farther to the right, while, if the potential of the source 7 decreases, the arm 12 will move to the left and decrease the impedance of tube 1. In any case the impedance of the tube varies inversely with the space current flowing therethrough. If desired, the elements 13, 14, 15 and 16 may be omitted so that the arm 12 may be controlled manually to regulate the flow of rectified current. Although the grid 3 is shown in conventional form within the tube 1, it is to be understood that the grid or control element 3 may be located outside the tube 1, as shown, for example, in Patent No. 1,278,535, to Weagant, patented September 10, 1918.

Figure 2:
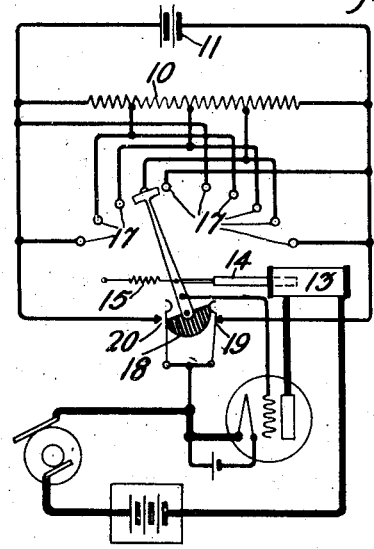
Fig. 2 is similar to Fig. 1, but shows means for reversing the potentiometer.

Fig. 2 shows a circuit similar to that of Fig. 1 with a special form of potentiometer so arranged that the grid battery may supply a potential variation to the grid of twice the range that is obtainable from the potentiometer such as is shown in Fig. 1. The doubling of the range of the potentiometer is accomplished by a reversing switch which is actuated when the potentiometer reaches a predetermined limiting position. Potentiometer 10, energized by the source of potential 11, is provided with a series of contacts 17, 17, etc., arranged in an arc. Contact arm 12 is designed to engage any one of the contacts 17 and is provided with an insulated cam 18 for closing contacts 19 and opening contacts 20 when the arm 12 rotates to the left of the neutral position midway between the end contacts of the potentiometer, and for closing contacts 20 and opening contacts 19 when arm 12 rotates to the right of the mid-position. Contacts 17, 17, etc., are so connected to the potentiometer 10 that a rotation of the arm 12 to the left decreases the negative potential or increases the positive potential of the grid depending upon whether the arm be at the right or the left side, respectively, of the mid-position. In rotating to the right, arm 12 decreases the positive potential or increases the negative potential of the grid depending upon whether the arm 12 is at the left or right side, respectively, of the mid-position.

The operation of the system of Fig. 2 is similar to that of Fig. 1. Increases of current above the normal value cause arm 12 to rotate to the right to increase the impedance of the rectifier, while decreases of current below the normal value cause the arm to rotate to the left to decrease the impedance of the rectifier. In either case a variation in current flowing through the rectifier is substantially compensated for by a corresponding variation in the impedance of the rectifier. The circuit may be manually controlled by omitting the elements 13, 14 and 15, and adjusting the arm 12 as desired.

Figure 3:
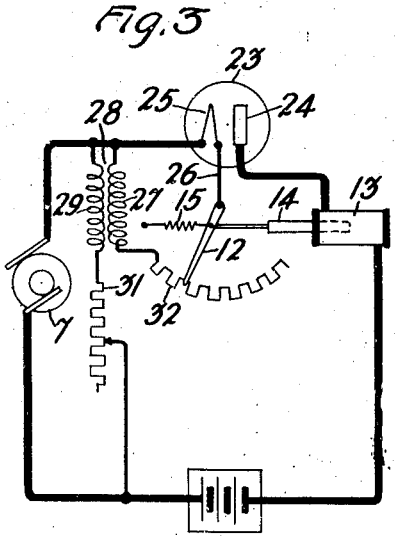
Fig. 3 illustrates a rectifier of the two-electrode type controlled by varying the temperature of the cathode.

In Fig. 3 the vacuum tube 23 includes the anode 24 and the cathode 25 to which is connected the heating circuit 26 including therein the secondary winding 27 of the transformer 28, the primary winding 29, of which, is energized by the source of alternating current 7. Rheostats 31 and 32 are provided in series with the windings of the transformer 28 for the purpose of regulating the amount of heating current supplied to the cathode 25, the temperature of the cathode being controlled by either or both rheostats. It is well known that an emission of electrons or the like may be produced by heating the cathode, or by supplying energy of some other form to the cathode of an electric discharge device such as the tube 23. The impedance of the tube 23 may be varied over a considerable range by varying the amount of emission from the cathode 25, by adjusting rheostats 31 or 32. If it is desired to control the rectified current automatically, the solenoid 13, plunger 14 and restoring spring 15 may be utilized to rotate the contact arm 12 of the rheostat 32 in such a manner that increasing the current through the solenoid 13 will cause the contact arm 12 to move to the right, while decreasing the current will cause the arm 12 to move to the left. The movement of the arm to the right increases the resistance of the heating circuit 26 thus reducing the emission from the cathode and increasing the impedance of the tube 23. It will thus be seen that when current through tube 23 increases, the heating current or energy supplied to the cathode decreases, and vice versa. In other words, the rate of energy supply to the cathode is varied inversely to the rate of migration of electrons from the cathode.

It is obvious that the solenoid 13 may be made to actuate the rheostat 31 in the primary circuit of the transformer 28 instead of the rheostat in the secondary circuit.

Figure 4:
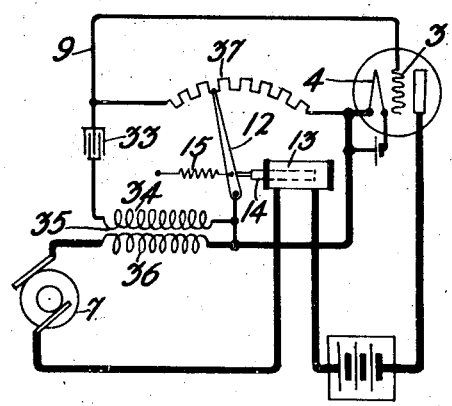
Fig. 4 illustrates a grid controlled rectifier provided with a variable grid leak path.

In Fig. 4 the grid circuit 9 includes the condenser 33 in series with the secondary winding 34 of the transformer 35, primary winding 36 of which is energized by current from source 7. Between the grid 3 and the cathode 4 is connected the grid leak path 37 for dissipating the charge accumulating upon the condenser 33 and for stabilizing the potential of the grid 3. By varying the position of contact arm 12, it will be noted that the portion of the leak path to the right of contact arm 12 is short circuited so that the portion of the leak resistance 37 which is effective in shunting condenser 33 is varied by the rotation of arm 12.

The intensity of the rectified current may be controlled by rotating arm 12 to such a position that the accumulated charge on the condenser 33 providing a negative potential on the grid 3 produces the requisite impedance in the tube 1. For automatically controlling the intensity of the rectified current solenoid 13, plunger 14 and spring 15 may be arranged to rotate the contact arm 12 in such a manner that increasing the rectified current increases the resistance of the leak path, thereby causing an accumulation of negative charge upon the condenser 33 and the grid 3, to increase the impedance of the tube 1 and thus maintain the current substantially constant.

In Fig. 5, the grid circuit 9 includes therein the high resistance rheostat 38 in series with the secondary winding 39 of the transformer or variable mutual inductance 40, having a variable coupling or ratio of transformation, the primary winding 41 being energized by the source of alternating current 7. The transformer 40 may be of the type in which one winding is rotatable or slidable with respect to the other. Rectified current flowing through tube 1 may be controlled by adjusting the ratio of transformation or the coupling of the transformer 40 whereby the potential of grid 3 may be regulated in magnitude or sign to vary the impedance of the tube 1. The transformer windings 41, 39 are preferably normally poled with respect to the grid circuit 9 and the anode circuit 6 so that at instants when a positive potential is produced by the source 7 upon the anode 2 a negative potential appears upon the grid 3. The resistance of the grid circuit may be controlled by the adjustment of the high resistance element 38. By arranging the solenoid 13 together with the plunger 14 and the spring 15 so that variations in rectified current flowing through the solenoid vary the coupling of transformer 40 by rotating or sliding one winding with respect to the other, the rectified current may be automatically adjusted or maintained constant. If the circuit is arranged to provide a negative grid at instants when the anode is positive, an increase of rectified current should produce an increase of coupling so that the negative potential of the grid 3 is increased to compensate for the increased current.

In Fig. 6 the vacuum tube 43 is provided with anode 44, grid 45, cathode 46 and the vacuum tube 47 includes therein the anode 48, grid 49, cathode 50. Cathodes 46 and 50 are connected in a series heating circuit with the secondary winding 51 of the transformer 52, the primary winding 53 of which is energized by the source of alternating current 7. The secondary winding 54 connected at one end to the anode 44 and at the other end to the anode 48 is so related to the primary winding 53 that at any instant the component of potential impressed by the winding 53 upon one anode is of opposite sign to that of the component of potential impressed upon the other anode. At the midpoint of winding 54 is connected the common path 55 for rectified current, the other end of said path being connected to the cathode heating circuit and including therein the storage battery 8 in shunt to which is connected the potentiometer 56 of such high resistance as to draw no appreciable current from battery 8 or the source 7. The grids 45 and 49 are connected to rotary contact arm 12 by means of which the setting of the potentiometer 56 may be varied to apply the desired controlling potential to the grids 45 and 49 for the purpose of regulating the impedance of the tubes 43, 47, to control the amount of rectified current flowing therethrough. In rectifying current from the source 7, at instants when the anode 44 is positive and the anode 48 negative, rectified current will flow through tube 43 and the common path 55 including the storage battery 8, and when anode 48 becomes positive the anode 44 will be negative, and rectified current will pass through the tube 47 and the common path 55. By varying the position of the contact arm 12 a greater or less negative potential may be applied to the grids to produce a greater or less impedance in the tubes. For automatic regulation of the rectified current the solenoid 13 may be connected in the common path 55 to actuate the plunger 14 and contact arm 12 against the opposing force of restoring spring 15. Upon increase of rectified current through the solenoid 13, contact arm 12 is rotated to a position at which greater negative potential is applied to the grids 45 and 49 while a decrease of current through the solenoid 13 results in a rotation of the contact arm 12 to a position at which a less negative potential is applied to the grids. In this way the impedance of the tubes 43 and 47 is varied to compensate for variations in the rectified current.

In Fig. 7, the secondary winding 57 of transformer 58 supplies heating current to the cathodes 46 and 50. Primary winding 59 supplies space current to the tubes 46 and 50 through secondary winding 60, one end of which is connected to anode 44 and the other end to anode 48, the winding 60 being so poled as to produce a component of potential on one anode which is opposite in sign to the component of potential applied to the other anode at any given instant. At the midpoint of the secondary winding 60 is connected the common path 55 for rectified current including therein the storage battery 8 and, if desired, the inductance coil 61 for smoothing out cyclic variations in the rectified current. Secondary winding 57 is provided with a series of potential taps terminating in sets of contacts 62 and 63. Connected to grid 45 is rotary contact arm 64, arranged to make contact with any desired one of contacts 62 whereby any desired potential may be impressed upon the grid 45 to control the amount of rectified current passing through the tube 43. In a similar manner rotary contact arm 65 is connected to the grid 49 and arranged to make contact with any desired one of the contacts 63 for controlling potential of grid 49 and the amount of rectified current passing through the tube 47. For automatically controlling the rectified current passing through the tubes, the solenoid 66 may be inserted in circuit with the anode 44 and the solenoid 67 inserted in circuit with the anode 48 so that an increase of current through either of the solenoids will increase the negative potential upon the associated grid. Winding 57 is preferably so poled that increasing the current through a solenoid increases the negative potential or decreases the positive potential of the associated grid whereby the impedance of the tube to rectified current increases. It will be noted that variations in the positions of contact arms 64 and 65 vary the mutual inductance or, in other words, the effective transformer ratio between the primary winding 59 and that portion of the secondary winding 57 which is included in a grid circuit between said grid and the associated cathode. If desired winding 59 may be omitted and generator 7 connected directly to the terminals of winding 60 which will then act as an autotransformer.

The system shown in Fig. 8 is similar to that shown in Fig. 7, except for the method of obtaining variations in the potential of the grids 45 and 49. In Fig. 8 the potentiometers 68 and 69 are arranged in parallel with each other and energized by the secondary winding 60 associated with the anodes 44 and 48. During times when space current is flowing through one of the tubes, current will be flowing through the potentiometers 68 and 69 whereby a potential is applied to the grids. By adjusting rotary contact arms 64 and 65, the potential of grids 45 and 49 may be adjusted to any suitable value to produce the desired impedance in the tubes 43 and 47 for regulating the amount of rectified current passing therethrough. Solenoids 66 and 67 may be so arranged as to rotate contact arms 64 and 65 as in Fig. 7.

It will be noted that the means, shown in all of the figures of the drawings, for regulating the rectified current, are arranged to vary said current gradually, or by degrees, so that the operation is rendered more stable than that obtainable with apparatus which varies abruptly from a maximum to a minimum value and depends upon a constant fluttering of the control parts to provide the desired adjustment.

The circuits of Figs. 1 to 5 inclusive have been shown provided with only one tube, but it is obvious that these circuits are adapted to operate with two tubes as in Figs. 6, 7 and 8. Similarly, in Figs. 6, 7 and 8, one of the tubes may be omitted. Instead of using two separate devices, a single vessel may be used to contain all the elements of two discharge devices.

While the invention, for the sake of clearness, has been disclosed as applied particularly to rectifying systems in connection with storage batteries it is obvious that the disclosed means for controlling the current and voltage in a circuit are readily applicable to any type of circuit containing variable sources of energy or variable energy absorbing means or both, as well as circuits containing variable impedances, and it is not intended that the invention be considered limited to any of the specific forms shown in the drawings. The appended claims more particularly point out the nature of the invention which it is desired to protect.

What is claimed is:

1. In a rectifying system, a pair of rectifiers, each having an anode, a cathode, and a grid, a source of alternating current oppositely related to said anodes, a transformer for connecting said source to the grids, and means for varying the effective ratio of secondary turns to primary turns of said transformer to apply similar potentials to each of said grids and to mechanically vary the adjustment of said grid potentials in response to variations in rectified current.

2. In a rectifying system, a pair of rectifiers, each having an anode, a cathode, and a grid, a source of alternating current oppositely related to said anodes, a transformer connected to said source for supplying heating current to the cathodes and for impressing potential on the grids, mechanical means in circuit with said grids for varying the effective ratio of the secondary turns to the primary turns of said transformer to control the grid potentials, and means automatically operated in response to variations in rectified current for operating said mechanical means.

3. In a rectifying system, a pair of rectifiers, each having an anode, a cathode, and a grid, a source of alternating current for heating said filaments and oppositely related to said anodes, and to said grids, and means in circuit with said anodes responsive to variations of rectified current to vary the relation of said source to said grids.

4. In a rectifying system, an alternating current circuit, a pair of rectifiers oppositely related to said circuit, each of said rectifiers having an anode, a cathode and a grid element, a pair of output circuits connected to said rectifiers for leading off rectified current from said rectifiers, a transformer connected to said alternating current circuit for supplying heating current to the cathodes and for impressing potential on said grids, a separate control circuit for connecting the secondary winding of said transformer to the grid element of each rectifier, and means connected with each of said rectifiers to adjust the associated control circuit to vary the effective transformer ratio between the secondary turns and the primary turns in response to variations in rectified current.

5. In a rectifying system, a rectifier having an anode, a cathode, and a grid, a source of alternating current, and a load for rectified current in circuit with said anode; a transformer connected to said source for supplying heating current to said cathode and for impressing potential on said grid, a switch in circuit with the secondary winding of said transformer and said grid for varying the grid potential, and means traversed by rectified current for controlling said switch.

6. In combination, a source of alternating current, a load circuit connected with said source, including an electric discharge device, a load, and energy-responsive means; said device having an anode, a cathode, and a grid; and an adjustable transformer circuit connected to said source of current and associated with said device, said transformer being governed by said responsive means to vary the effective transformer ratio of primary turns to secondary turns and control the potential upon said grid.

7. In a rectifying system, a rectifier having an anode, a cathode, and a grid, a source of alternating current and a load circuit for rectified current in circuit with said anode, a leak path in circuit with said grid, mechanical means for varying said leak path, and means traversed by rectified current for operating said mechanical means to vary said leak path.

8. In combination, a source of current, a load to be supplied with said current, an electric discharge device connected between said source and said load, a potentiometer associated with said device to control current flowing through said device, and a set of reversing contacts associated with said potentiometer by means of which said potentiometer is reversed when actuated to a predetermined limit.

9. In combination, a source of current, a load to be supplied with said current, an electric discharge device and current responsive means connected between said source and said load, a transformer having an adjustable ratio of effective secondary to primary turns associated with said device, and varied by said current-responsive means to control current flowing through the space path of said device.

10. In combination, a source of alternating current, a load circuit connected with said source, including an electric discharge device having an anode, cathode, and a grid element, a load, an energy-responsive means; and an adjustable transformer circuit, associated with said device for impressing a potential on said grid, said transformer circuit being gradually varied by said responsive means to control the potential on said grid and regulate the current flowing through the space path of said discharge device.

11. In combination, a source of alternating current, a load circuit connected with said source, including an electric discharge device, a load, and energy-responsive means; and a transformer having means for varying the ratio of effective secondary to primary turns associated with said device, said transformer ratio being varied by said responsive means to regulate the current flowing through said discharge device.

In witness whereof, I hereunto subscribe my name this 29th day of September, A. D. 1921.

ELMER V. GRIGGS.